Jan. 30, 1951     J. B. GESTWICK     2,539,617
PNEUMATIC TIRE
Filed April 8, 1947     2 Sheets-Sheet 1
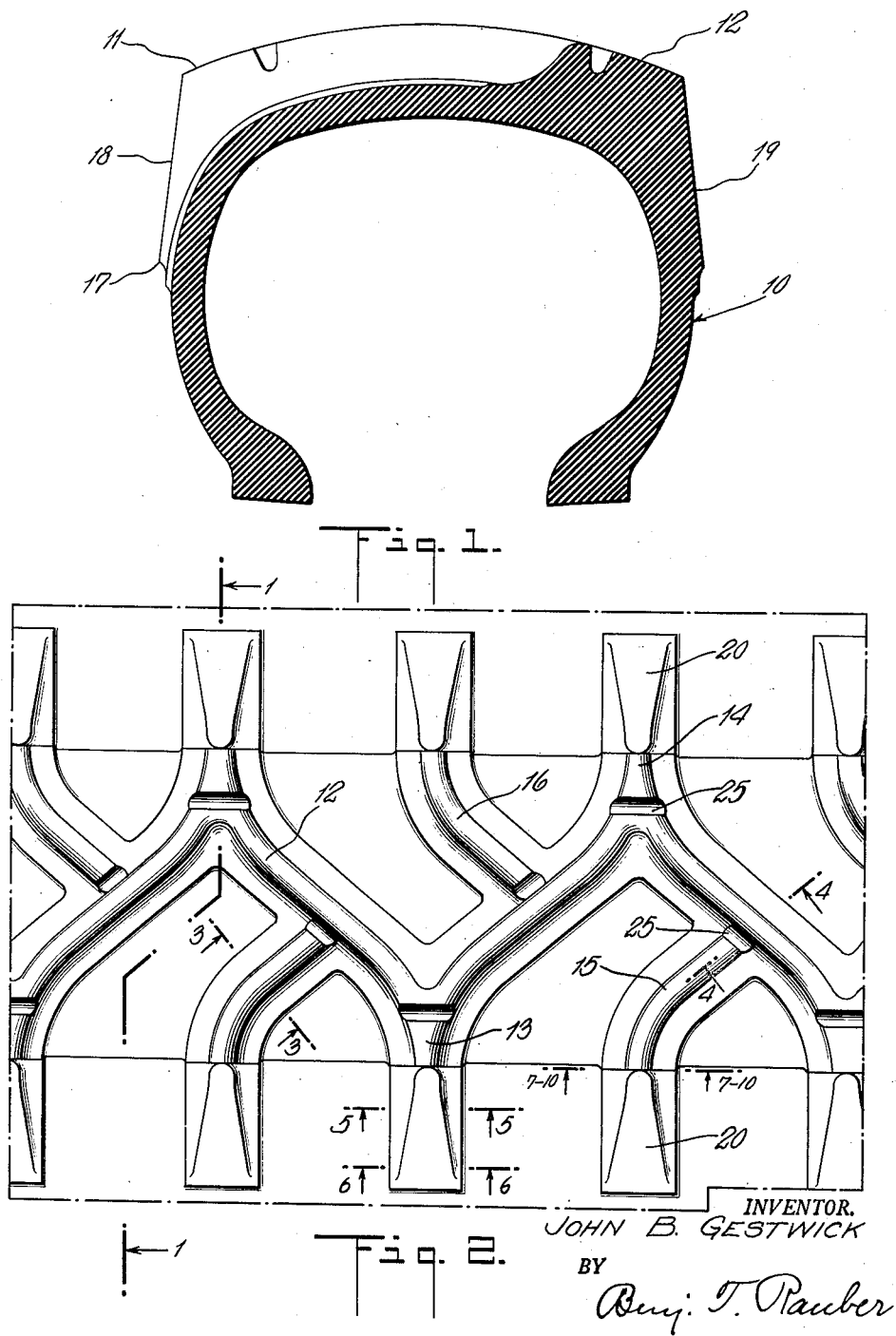
INVENTOR.
JOHN B. GESTWICK
BY
*Benj. T. Rauber*
ATTORNEY Jan. 30, 1951  J. B. GESTWICK  2,539,617
PNEUMATIC TIRE Filed April 8, 1947  2 Sheets-Sheet 2

INVENTOR.
JOHN B. GESTWICK
BY
Benj. T. Rauber
ATTORNEY

Patented Jan. 30, 1951

2,539,617

UNITED STATES PATENT OFFICE 2,539,617

PNEUMATIC TIRE

John B. Gestwick, Buffalo, N. Y., assignor to Dunlop Tire and Rubber Corporation, Buffalo, N. Y., a corporation of New York Application April 8, 1947, Serial No. 740,021

1 Claim. (Cl. 152—209)

My present invention relates to a pneumatic tire and more particularly to a pneumatic tire for tractors.

Pneumatic tires of the above type are generally provided with ridges or "tread bars" projecting a substantial distance above the general level of the tire, these tread bars or ridges serving to penetrate the ground and provide a better traction.

In my present invention I provide a tread bar or ridge construction for the treads of tires of the above type, to provide reduced rolling resistance, increased penetration and draw bar pull, and a more effective self-cleaning of the tire.

In my present invention I provide a ridge type of tread bar in which the uppermost or outermost surface of the ridge, which makes the initial or "hard surface" contact with the ground or pavement, is greatly reduced. This may be done by narrowing the upper part of the ridge to a line or narrow plateau or by rounding it. The ridges or tread bars being narrowed in this manner serve to penetrate the ground and also come out of the depressions made in the ground the more easily as the tire rolls on.

The various features of the invention are illustrated, by way of example, in the accompanying drawings in which:

Fig. 1 is a cross-section taken on line 1—1 of Fig. 2 of a tire embodying the present invention;

Fig. 2 is a face view of the tread of the tire laid flat to show the construction of the ridges or tread bars;

Figure 3:
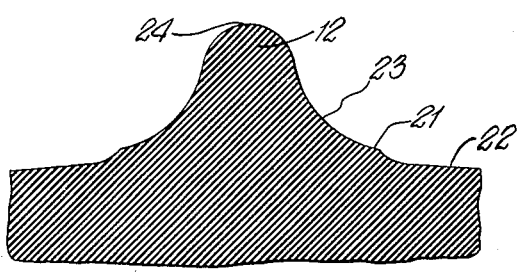

Figs. 3, 4, 5 and 6 are sections taken on lines 3—3, 4—4, 5—5 and 6—6, respectively of Fig. 2;

Figs. 7, 8, 9 and 10 are cross-sections of modified forms of bars or ridges as if taken on the lines 7—7, 8—8, 9—9 and 10—10 of Fig. 2.

Referring more particularly to Figs. 1 to 6 inclusive the tire 10 embodying the invention is provided with a tread 11 shown in developed or flattened condition in Fig. 2. This tread comprises a ridge or tread bar 12 extending in a zig-zag manner circumferentially of the tire and has extending from the corners or apices of the angles of the zig-zag short sidewise extensions 13 and 14 on opposite sides of the tread. It may also have extensions 15 and 16 extending from mid points of the diagonal parts of the zig-zag to the side walls and thus serve to provide supporting ridges in the wider spaces between the zig-zag formation.

The tread portion extends downwardly on the side wall of the tire as indicated by the line 17 in Fig. 1 to provide the side walls, or edges 18 and 19 slightly diverging from the vertical. The extensions 13, 15 and 16 over the side wall part of the tire are gradually flattened as indicated at 20, Figs. 2, 5 and 6.

As shown in Fig. 3 each of the ridges 12—16 comprises a relatively wide base 21 raised slightly from the general level 22 of the tread from which it narrows upwardly on the concavely rounded or recessed surfaces 23 to the upper part which is then rounded at 24. The part 24 of the tread that first comes into contact with the ground or pavement, being narrowed and rounded, penetrates more readily into the ground, providing a better grip and is easily withdrawn from the depression formed by it in the ground.

Figure 4:
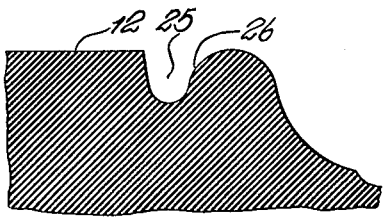
Figure 5:
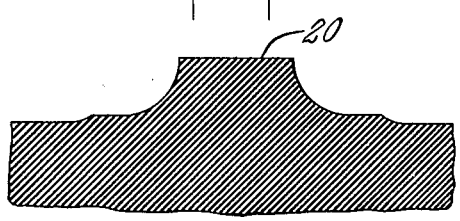
Figure 6:
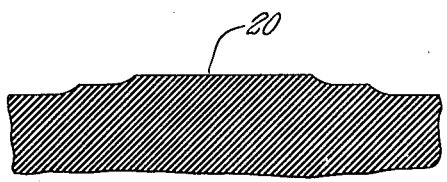

As indicated in Fig. 4, the extensions 13, 14, 15 and 16 may be separated from the main part or zig-zag of the tire tread by grooves 25 and the upper part of the groove 25 may be rounded as at 26 to provide a decreasing area of contact toward the upper surface of the extension. This also provides a groove which widens outwardly and in which, therefore, earth is less apt to adhere.

Figure 7:
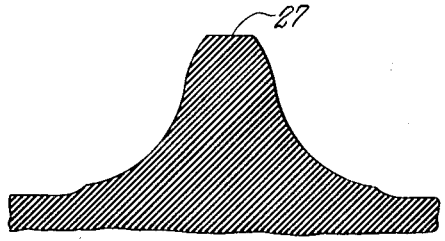

As shown in Fig. 7 the uppermost surface need not be completely rounded but may be flattened at the outermost part as indicated at 27, the rest of the ridge or tread bar being of the generally rounded contour of Fig. 3.

Figure 8:
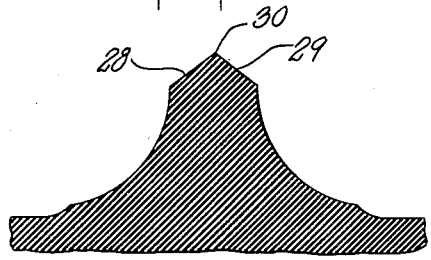

In Fig. 8 instead of having a rounded upper surface the outer surface is of a gable shape having upper surfaces 28 and 29 slanting toward an apex 30.

Figure 9:

In the form shown in Fig. 9 the cross-section of the ridge is somewhat similar to that of Fig. 7, but the upper surface 31 does not form an abrupt junction to the curved part, but has a generally rounded angle 32.

Figure 10:
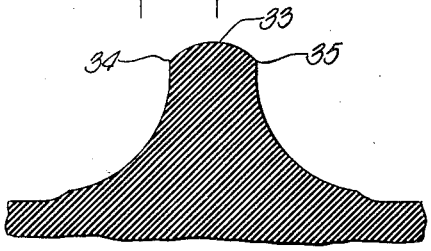

In the modification shown in Fig. 10 the uppermost surface of the ridge is rounded as at 33 but meets the concavely rounded side edges sharply as at 34 and 35. In each case, however, there is a narrowed or line contact between the uppermost part of the ridge and the ground with which it comes into contact.

Owing to the narrowed area of initial contact and the contracting or narrowing of the ridges toward their outer ends they tend to come free from the ground in which they have been impressed causing a more effective cleaning of the tire. This also results in reduced rolling resistance and an increased draw bar pull.

Having described the invention, what I claim is:

A pneumatic tire having a tread ridge extending in a zig-zag line circumferentially of said tire, said ridge narrowing from a base upwardly on opposite concave side surfaces and convexly rounded at its top, said tire having extensions from the apices of said zig-zag to the side walls of said tire and having grooves between said apices and said extensions, the upper part of said grooves being rounded toward said extensions.

JOHN B. GESTWICK.

REFERENCES CITED

The following references are of record in the file of this patent:

UNITED STATES PATENTS

| Number | Name | Date |
|---|---|---|
| 1,664,352 | Coleman | Mar. 27, 1928 |
| 2,203,617 | Hale | June 4, 1940 |
| 2,324,996 | Coben | July 20, 1943 |

FOREIGN PATENTS

| Number | Country | Date |
|---|---|---|
| 3,262 | Great Britain | 1907 |
| 731,549 | France | Sept. 3, 1932 |